Patented Feb. 24, 1942

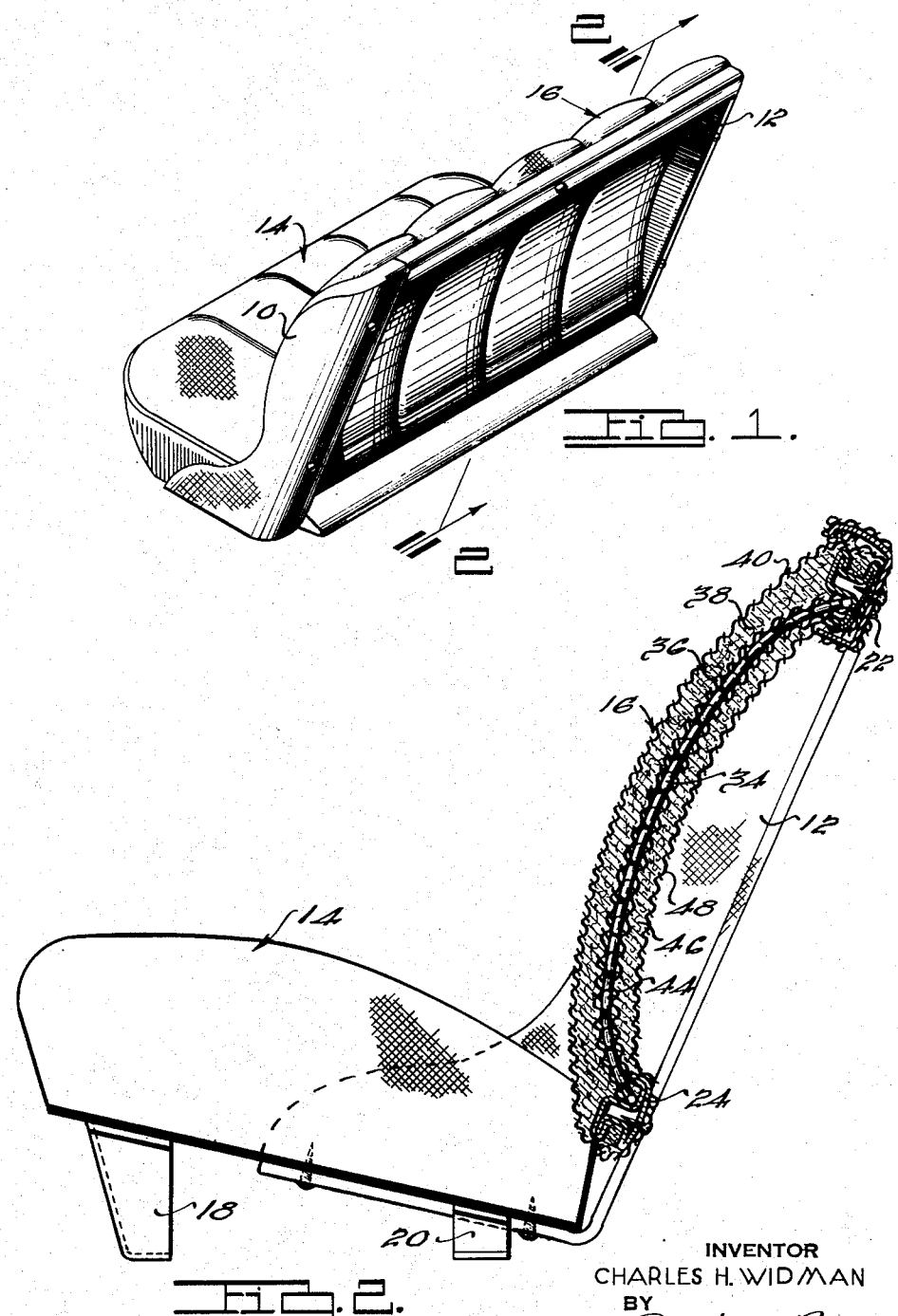

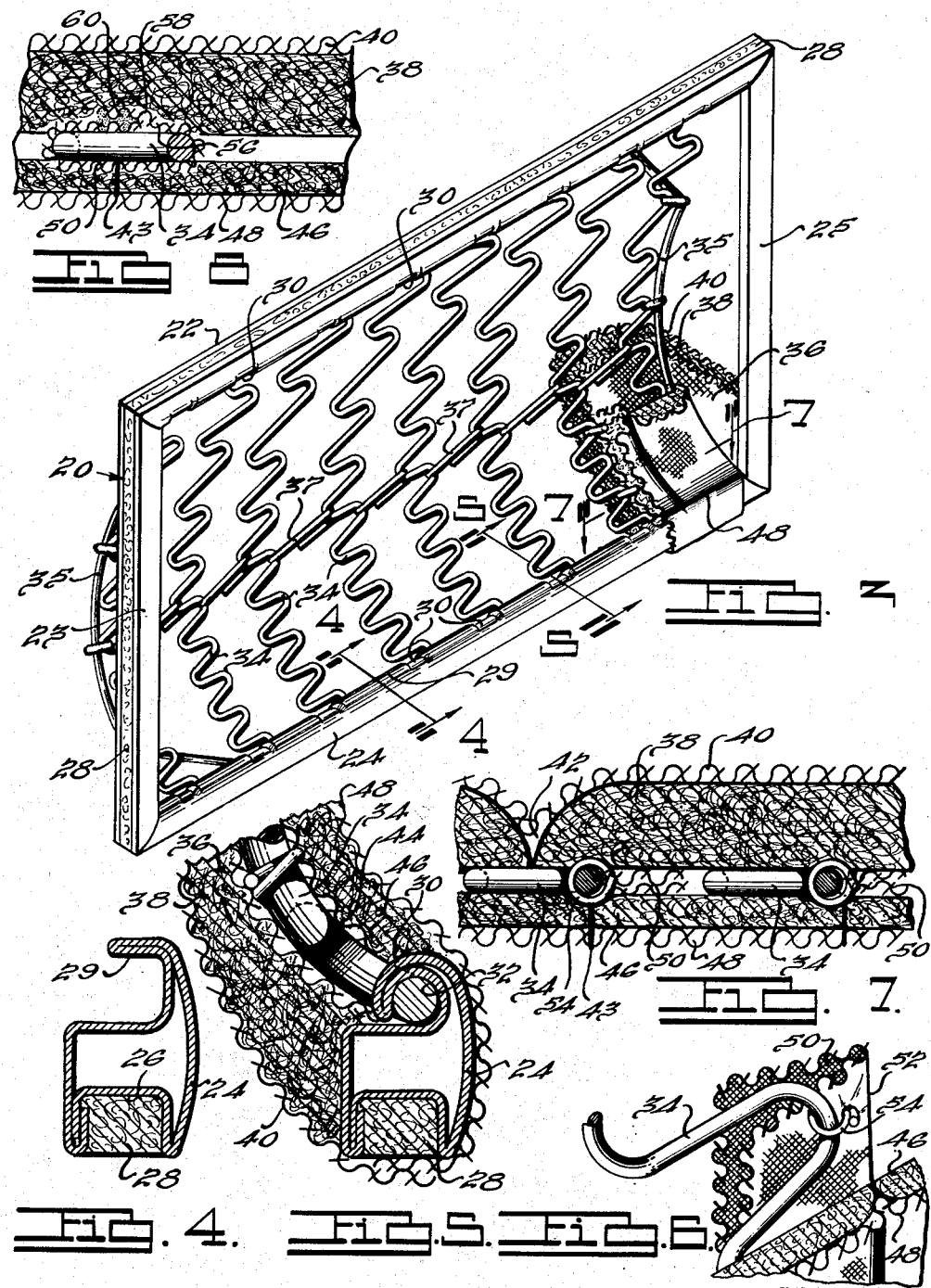

2,274,176

UNITED STATES PATENT OFFICE 2,274,176

SEAT CONSTRUCTION

Charles H. Widman, Detroit, Mich., assignor to The Murray Corporation of America, Detroit, Mich., a corporation of Delaware Application September 13, 1937, Serial No. 163,535

2 Claims. (Cl. 155—179)

This invention relates to improved seat constructions; and particularly relates to improved seat constructions for vehicles.

One of the primary objects of the present invention is to provide the seat construction which conserves space within a vehicle, or the like, within which the seat is mounted.

Another object of the invention is to provide a seat construction having a forwardly arched back in which the cushioning material on the back surface of the back conforms to the shape of the arc.

A further object of the invention is to provide a simplified manner of attaching a back cushion to the back surface of an arched seat back so that the back cushion conforms to the shape of the arc.

A further object of the invention is to provide an arched seat back having a high degree of resiliency which is of minimum thickness throughout its height.

A further object of the invention is to provide an arched vehicle seat back of uniform depth or thickness throughout its height.

Another object of the invention will become apparent from the following specification, the drawings relating thereto, and from the claims hereinafter set forth.

In the drawings in which like numerals are used to designate like parts in the several views throughout:

Figure 1 is a perspective view of a seat construction embodying features of the present invention;

Fig. 2 is a cross-sectional view, with parts in elevation, taken substantially along the line 2—2 of Fig. 1;

Fig. 3 is a perspective view with parts removed of a seat back embodying features of the present invention;

Fig. 4 is a cross-sectional view taken substantially along the line 4—4 of Fig. 3;

Fig. 5 is a fragmentary cross-sectional view taken substantially along the line 5—5 of Fig. 3;

Fig. 6 is a fragmentary perspective view illustrating certain details of the present invention;

Fig. 7 is a cross-sectional view taken substantially along the line 7—7 of Fig. 3; and Fig. 8 is a view similar to Fig. 7 illustrating a modified form of the present invention.

The seat construction according to the present invention is particularly adaptable for use in vehicles, or the like, in which it is extremely desirable and important that space be conserved. According to the present invention, a seat back of high resiliency is provided which is arched forwardly and which is of substantially uniform depth or thickness throughout its height so that the space under the arc on the back of the seat is kept free and is available for efficient use. When the seat is used as a front vehicle seat, or as a seat having another seat positioned to the rear thereof, the space is available for additional leg room and thus contributes to the comfort of the vehicle occupants as well as permits efficient use of the available space in the vehicle. Also when the seat is used as a rear vehicle seat, it is evident that the construction of the present invention affords additional space which may be utilized as additional space for a storage compartment and the like.

While according to the broader aspects of the present invention the particular type of spring elements disclosed is not necessary, that particular type disclosed does have particular utility in the structure disclosed and claimed. The spring elements forming the load supporting surface are formed of wire bent to provide a similar series of adjacent lateral convolutions in which all of the convolutions are bent to lie in substantially the same surface. The last lateral convolution of each of the spring elements is locked in engagement with a generally channel shaped portion of a border frame element which serves to secure the ends of each of the spring elements in predetermined position. The spring elements are tensioned so that they have an inherent tendency to lie along an arc substantially smaller than that they are forced to assume in the cushion construction which, therefore, inherently provides a resilience for each of the spring elements.

Referring to the drawings, and referring particularly to Figs. 1 to 7, a seat construction is illustrated which comprises side frame members 10 and 12 between which are mounted a seat cushion 14 and a back cushion 16. The seat cushion 14 may be of suitable conventional construction and is supported upon conventional supports 18 and 20 which rest upon the floor of the vehicle, or the like, within which the seat is mounted.

The back cushion 16 includes a generally rectangular border frame 20 which may be suitably secured to the side frame members 10 and 12. The border frame 20 includes upper and lower border elements 22 and 24 each of which has an outwardly directed channel portion 26 within which a tacking strip 28 is received. The border elements 22 and 24 are connected by end border elements 23 and 25 which have channel portions similar to those shown at 26 for the reception of the tacking strips 28. Each of the border frame elements 22 and 24 is also provided with another generally channel-shaped portion 29 which is bent downwardly at spaced points 30 therealong to provide spring engaging recesses 32 within which the last lateral convolutions of the sinuous arced spring elements 34 are received. The border elements 22 and 24 are in general of the type disclosed and claimed in the co-pending application of Alfred H. Haberstump and Clarence H. Menge, Serial No. 161,820, filed August 31, 1937.

The sinuous spring elements 34 are so disposed in the border elements 22 and 24 that they are arched forwardly in an upwardly directed curved plane. Border wire members 35 which are bent on an arc similar to the arc of the spring elements 34 are preferably positioned adjacent the sides of the frame 20 and are secured in position by bent ends which are received in the recesses 32 in the same manner as the ends of the spring elements 34. In order to prevent lateral displacement of the spring elements 34, clips 37 engage the spring elements 34 at substantially their longitudinal centers across the back. While only one row of such clips is illustrated, it is evident that additional clips may be provided if desired.

A front cushioning layer which includes a fabric backing web 36 of suitable cloth or similar flexible woven material, a layer of felted padding material 38, and a woven fabric finish material 40 is disposed on the front surface of the spring elements 34 and is suitably secured along its edges to the tacking strips 28. The side ends of the front cushioning layer are preferably stretched rearwardly over the border wires 35 and are secured to the tacking strips within the end border elements 23 and 25. Due to the forward arc formed by the springs 34, the springs 34 are urged against the front cushioning layer and the front cushioning layer conforms to the arc of the spring elements. The front cushioning layer is provided with the usual grooves or channels 42 thereon which are formed by stitching indicated at 43 in the usual manner.

A back cushioning layer which includes a fabric backing web 44, a layer 46 of felted padding material and a woven fabric finish material 48 is disposed over the back surface of the spring elements 34 with the edges of the finish material 48 attached to the tacking strips 28 in the border elements 22 and 24.

In order to secure the back cushioning layer to the back surface of the spring elements 34 so that the back cushion is of substantially uniform depth throughout its height and so that the back cushioning layer conforms to the shape of the arc formed by the shape of the spring element so as to conserve space according to the present invention, strips of listing material 50 are secured to the fabric backing web 44 by the stitching 43 at spaced intervals across the back cushion so that the listing strips 50 extend upwardly of the back cushion. The listing strips 50 may be stitched along an edge 52 by the stitching 43 to the fabric backing web 44 and thus be secured in place. The listing strips 50 afford the means by which the back cushion is secured to the spring elements 34; and hog rings 54 are preferably used which embrace the spring elements 34 at spaced points therealong and are clamped through the listing strip 50. A sufficient number of hog rings are provided so that the back cushioning layer conforms to the arc formed by the spring elements throughout the back surface of the back cushion 16.

Referring to Fig. 8, a modified manner of attaching the listing strip 50 to the spring element 34 is illustrated in which the listing strip 50 is stitched by the stitching 43 to the backing web 44 (not shown in Fig. 8) and in which the free ends 56 and 58 of the strip are wrapped around the spring element 34 and are secured together by means of an adhesive 60. The listing 50 with its ends 56 and 58 secured by the adhesive thus provides an elongated pocket within which the sinuous spring elements 34 are received.

Formal changes may be made in the specific embodiments of the invention described without departing from the spirit and substance of the invention the scape of which is commensurate with the appended claims.

What is claimed is:

1. A back rest cushion construction for the forwardly arranged seat of a seating arrangement in which one seat structure is arranged directly behind another seat structure and faces in the same direction, comprising an open border frame, forwardly arched spring elements spanning said border frame and having their ends secured to said border frame, upholstered cover material curved to the shape of said arched spring elements and fitted over both the front and the rear face thereof, and means securing the cover material to the spring elements whereby the cover material on each face of the spring elements conforms closely thereto, said structure providing a rearwardly opening, forwardly curved recess in said back rest to supply additional leg room for a person seated to the rear thereof.

2. A back rest cushion construction for the forwardly arranged seat of a seating arrangement having a forward seat construction and a seat structure to the rear thereof facing in the same direction, a back frame element, spring elements spanning said back frame element having their ends secured thereto and bowed forwardly providing a concave surface at the back, cover material extending over the spring elements and frame and fitted to both the front and rear faces thereof, and means for securing said cover material relative to said frame and spring so that the cover material on both faces of the bowed spring elements conform closely thereto whereby additional leg room is provided for the occupant of the seat immediately behind the seat having the back rest cushion.

CHARLES H. WIDMAN.